A. T. DAWSON AND G. T. BUCKHAM.
ORDNANCE BREECH MECHANISM.
APPLICATION FILED JULY 10, 1918.
1,345,536.
Patented July 6, 1920.
2 SHEETS—SHEET 1.
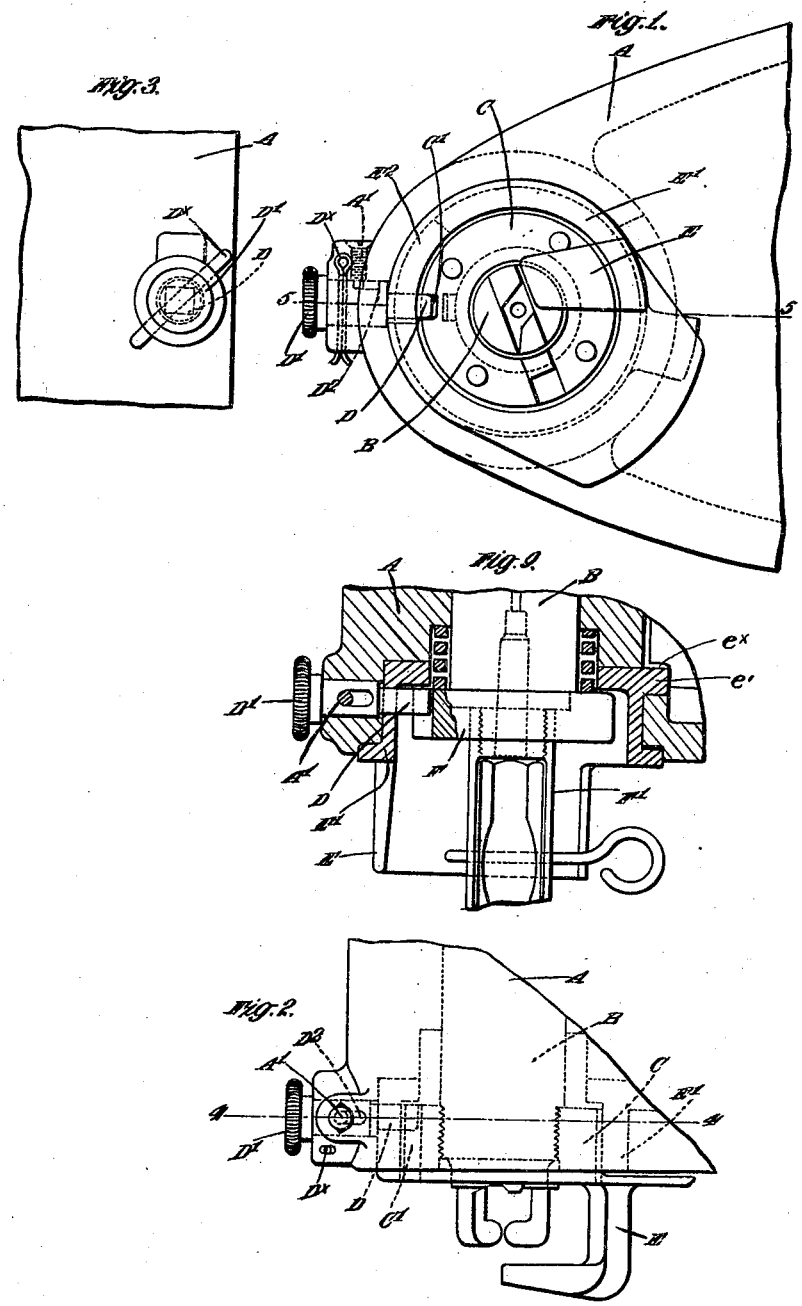

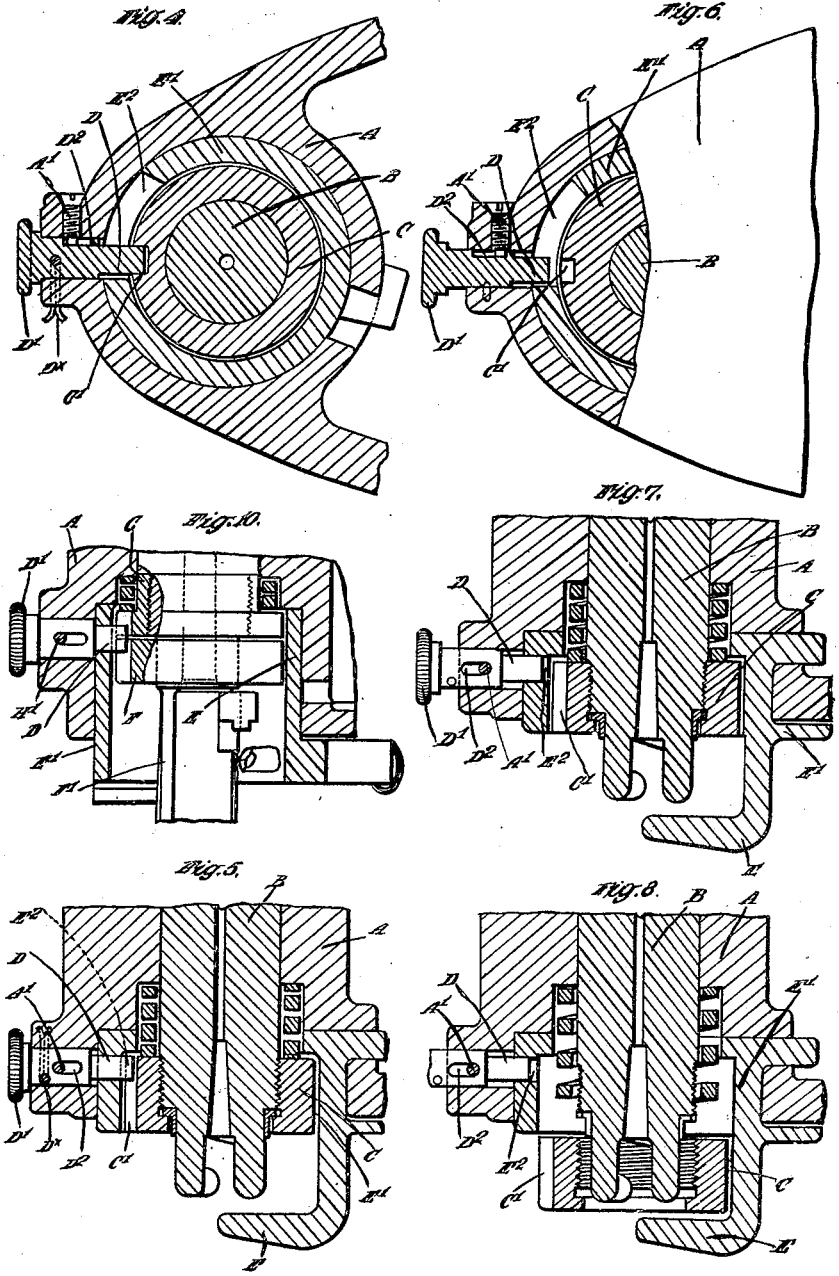

UNITED STATES PATENT OFFICE.

ARTHUR TREVOR DAWSON AND GEORGE THOMAS BUCKHAM, OF WESTMINSTER, LONDON, ENGLAND, ASSIGNORS TO VICKERS LIMITED, OF WESTMINSTER, ENGLAND.

ORDNANCE BREECH MECHANISM.

1,345,536. Specification of Letters Patent. Patented July 6, 1920.

Application filed July 10, 1918. Serial No. 244,335.

*To all whom it may concern:*

Be it known that we, Sir ARTHUR TREVOR DAWSON, knight, and Sir GEORGE THOMAS BUCKHAM, knight, both subjects of the King of Great Britain, residing at Vickers House, Broadway, Westminster, in the county of London, England, have invented certain new and useful Improvements in or Relating to Ordnance Breech Mechanism, of which the following is a specification.

This invention relates to ordnance breech mechanism of the breech screw carrier type having an obturator or mushroom (preferably of the "de Bange" type) whose axial vent bolt carries a nut serving as an abutment for the axial vent spring or carries a collar or washer serving as part of the means for attaching to the gun a modified rifle lock as described in certain of our concurrent patent applications, the nut or the collar or washer being retained, by suitable means, in position on the axial vent bolt.

According to the invention the means for retaining the nut (or the collar or washer) in position on the axial vent bolt comprise a catch which is mounted on the carrier in an accessible position so as to permit the said catch to be readily displaced to its disengaged position to enable the nut to be removed from the bolt. This catch is preferably in the form of a locking pin mounted radially in the rear part of the carrier and may be employed in conjunction with a safety-shutter for preventing a T tube or primer from being prematurely inserted into its chamber in the axial vent, in which event the said pin also serves to retain the shutter in position on the carrier.

In order that the said invention may be clearly understood and readily carried into effect we will describe the same more fully with reference to the accompanying drawings, in which:—

Figures 1 and 2 are respectively a rear elevation and a plan showing the locking pin used in conjunction with the axial vent nut and the aforesaid safety shutter.

Fig. 3 is a fragmental left-hand side view of Fig. 1.

Fig. 4 is a section taken approximately on the line 4, 4 of Fig. 2.

Fig. 5 is a section taken approximately on the line 5, 5 of Fig. 1.

Fig. 6 is a view similar to Fig. 4 but showing the locking pin in the disengaged position.

Fig. 7 is a view similar to Fig. 5 but showing the locking pin in the disengaged position.

Fig. 8 is a view similar to Fig. 7 but showing the axial vent nut removed from the axial vent bolt, and Figs. 9 and 10 are views similar to Fig. 5 showing the locking pin used in conjunction with other forms of mechanism hereinafter referred to.

A is the breech screw carrier, B the axial vent bolt and C the axial vent nut. D is the aforesaid locking pin and E is the aforesaid safety shutter. The shutter E comprises a radial arm on a sleeve E′ disposed in a recess in the carrier A around the rear part of the axial vent bolt and is retained in position by a pin D. This pin is detachably connected to the carrier and its inner end is disposed in a circumferential groove or slot $E^2$ in the sleeve E′. When the breech screw is locked, the shutter E occupies a position as shown in Fig. 1, and its outer end lies clear of the bayonet joint recess in the rear end of the axial vent bolt; a used T tube or a primer can then be extracted and a new one inserted. When unlocking movement is given to the breech screw, motion is imparted to the sleeve E′ and the shutter E is then brought into such a position that its inner end lies across the bayonet joint recess in the end of the axial vent bolt and thereby prevents a T tube or primer from being inserted into its chamber in the said bolt.

The locking pin D is slidably mounted in a radial hole in the rear part of the carrier A and at its outer end has a milled or otherwise suitably formed head D′ by which the pin can be displaced by the operator. The inner end of the pin normally engages with a slot C′ in the aforesaid nut C to retain it on the axial vent bolt and is locked in this position by a split pin $D^x$ or otherwise. The outward or disengaging movement of the pin is limited by any suitable means, such as a screw A′ which is mounted on the carrier and engages with a groove $D^2$ in the pin. The inner part of the said pin passes through a segmental slot $E^2$ in the sleeve E′ of the shutter E, this slot being of sufficient length to permit the required movements of the shutter to occur during the unlocking and locking of the breech screw. The aforesaid screw A' and the groove D² in the locking pin normally prevent the latter from being moved outward far enough to become disengaged from the said segmental slot E². When it is desired to remove the safety shutter as well as the nut C, the screw A' is unscrewed to bring it clear of the groove D² so as to enable the pin to be withdrawn from the segmental slot E².

Fig. 9 shows a construction in which the axial vent nut is replaced by a collar or washer F serving for the attachment of a modified rifle lock F'. In this case the locking pin D engages with a slot in the said collar or washer and also passes through a segmental slot in the sleeve E' of the safety shutter as above described. Fig. 10 shows a construction in which both the axial vent nut C and the collar or washer F are employed the locking pin D then serving to retain the axial vent nut, the rifle lock and the safety shutter in position.

What we claim and desire to secure by Letters Patent of the United States is:—

1. In ordnance breech mechanism of the breech screw carrier type, the combination with the axial vent bolt or mushroom stem and its spring, of a member serving as an abutment for one end of said spring and a displaceable catch mounted on the breech screw carrier for engaging with said member to hold it in position.

2. In ordnance breech mechanism of the breech screw carrier type, the combination with the axial vent bolt or mushroom stem and its spring, of a member serving as an abutment for one end of said spring and an axially displaceable locking pin engaging in a slot in said member for holding the latter in position.

3. In ordnance breech mechanism of the breech screw carrier type, the combination with the axial vent bolt or mushroom stem and its spring, of a member serving as an abutment for one end of said spring and an axially displaceable locking pin arranged radially in the breech screw carrier for engaging in a slot in said member to hold it in position.

4. In ordnance breech mechanism of the breech screw carrier type, the combination with the axial vent bolt or mushroom stem, its spring and the nut on said bolt serving as an abutment for one end of said spring, of a displaceable catch mounted on the breech screw carrier for engaging with said nut to hold it in position on the bolt.

5. In ordnance breech mechanism of the breech screw carrier type the combination with the axial vent bolt or mushroom stem, its spring, a rifle lock and a washer serving as an attachment for said lock and as an abutment for one end of said spring, of a displaceable catch mounted on the breech screw carrier for engaging with said washer to hold it in position.

6. In ordnance breech mechanism of the breech screw carrier type, the combination with the axial vent bolt or mushroom stem, its spring, the nut on said bolt serving as an abutment for one end of said spring, a rifle lock and a washer serving as an attachment for said lock, of a displaceable catch mounted on the breech screw carrier for engaging with said nut and with said washer to hold them in position.

7. In ordnance breech mechanism of the breech screw carrier type, the combination with the axial vent bolt or mushroom stem and its spring, of a member serving as an abutment for one end of said spring, a safety shutter for preventing a tube or primer from being inserted into its chamber in said bolt until the breech screw is locked, and a displaceable catch mounted on the breech screw carrier for engaging with said member and with the shutter to hold them in position.

In testimony whereof we affix our signatures.

ARTHUR TREVOR DAWSON.
GEORGE THOMAS BUCKHAM